March 8, 1966  C. T. BANKS  3,239,258
TYING MECHANISM

Filed Oct. 21, 1963  8 Sheets-Sheet 3

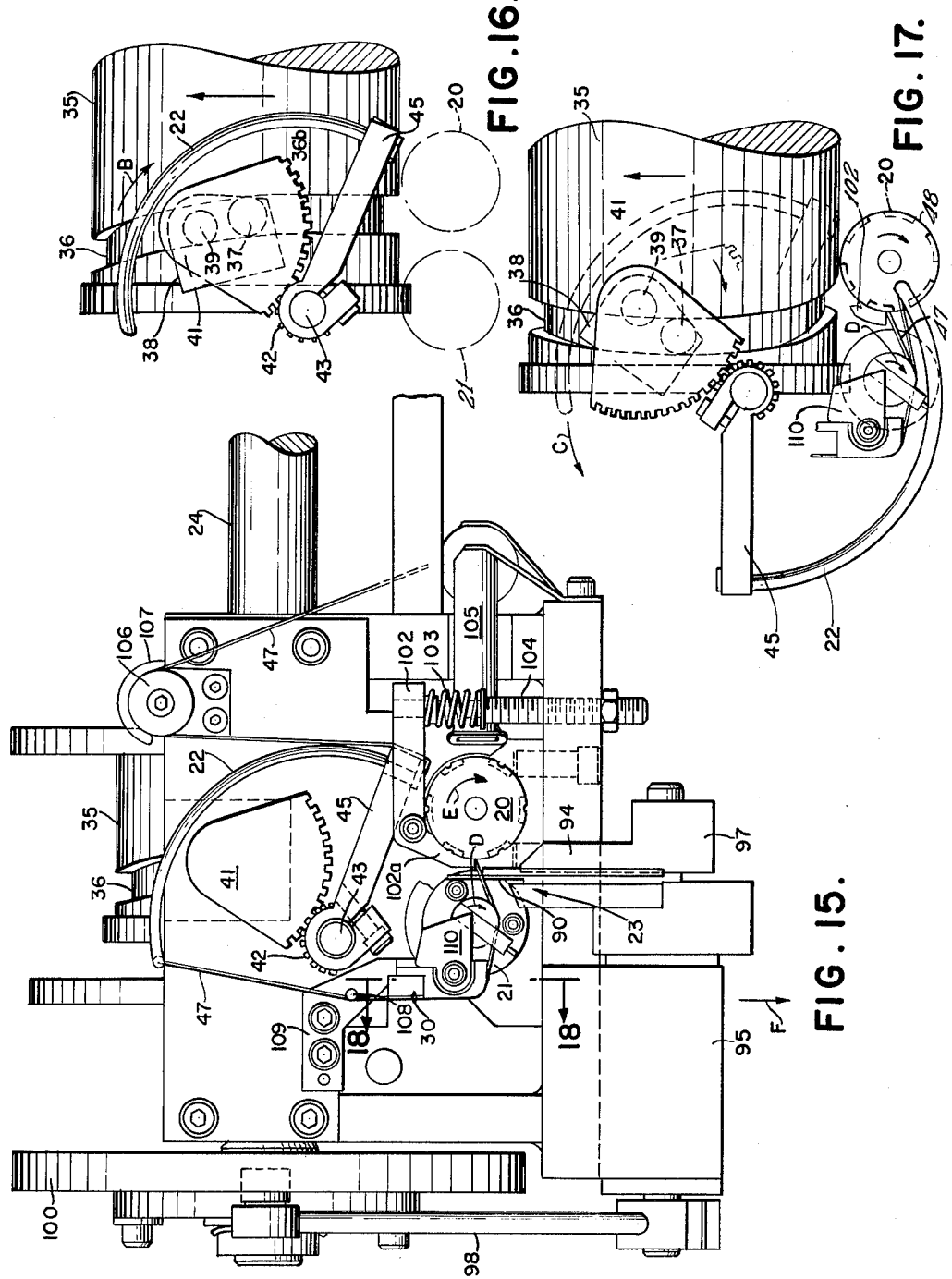

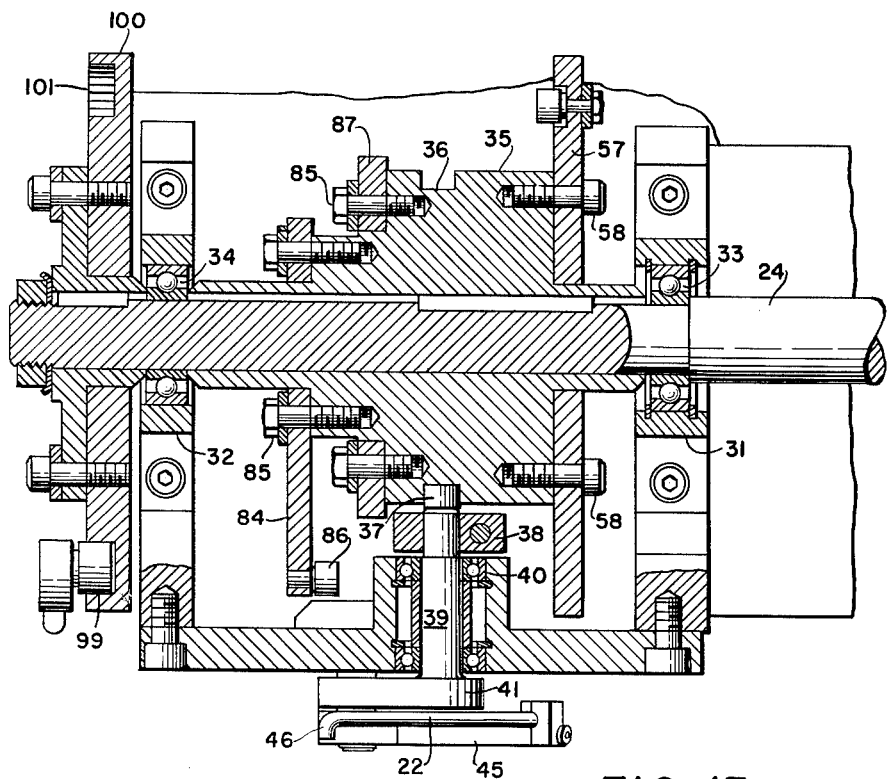
FIG. 13.
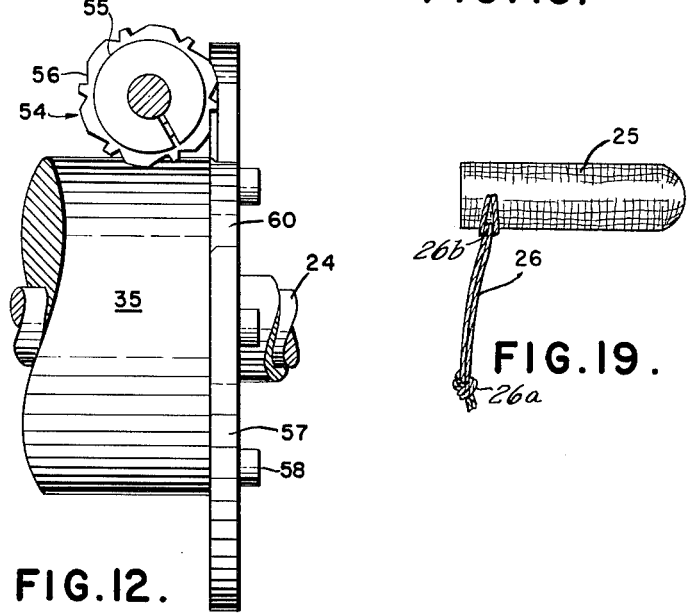
FIG. 12.
FIG. 19.

March 8, 1966   C. T. BANKS   3,239,258
TYING MECHANISM
Filed Oct. 21, 1963   8 Sheets-Sheet 7

United States Patent Office 3,239,258
Patented Mar. 8, 1966

3,239,258
TYING MECHANISM
Charles T. Banks, Neenah, Wis., assignor to Kimberly-Clark Corporation, Neenah, Wis., a corporation of Delaware
Filed Oct. 21, 1963, Ser. No. 317,550
11 Claims. (Cl. 289—5)

My invention relates to cellulosic products, such as tampons, and, more particularly, to mechanism for applying strings to tampons and for knotting these strings.

It is an object of the present invention to provide improved string knotting apparatus, the parts of which are relatively heavy in construction and which are driven by relatively heavy and durable driving mechanism. More particularly, it is an object of the invention to provide cam and follower devices for driving the parts of the knotting apparatus so that the knotting apparatus may be long lived.

It is still another object to provide an improved knotting mechanism which is particularly suitable for use in connection with the application of knotted strings to tampons and in connection with an automatic machine for making such tampons. Such an automatic machine may be of the type illustrated and described in the copending application of Henry Robert Cloots et al., Serial No. 773,020, filed November 10, 1958, now U.S. Patent 3,131,435, issued May 5, 1964.

The invention consists of the novel constructions, arrangements and devices to be hereinafter described and claimed for carrying out the above stated objects, and such other objects, as will be apparent from the following description of a preferred form of the invention, illustrated with reference to the accompanying drawings, wherein:

FIG. 12 is a fragmentary sectional view taken on line 12—12 of FIG. 1;

FIG. 13 is a sectional view taken on line 13—13 of FIG. 6;

FIG. 15 is a bottom view of the knotter mechanism taken from line 15—15 of FIG. 1;

FIGS. 16 and 17 are fragmentary bottom views of the knotter mechanism corresponding to FIG. 15, with various internal parts being shown and some parts being shown in changed positions;

FIG. 19 is a side view of a tampon with which the knotter mechanism is particularly adapted to be used.

Like characters of reference designate like parts in the several views.

Figure 1:
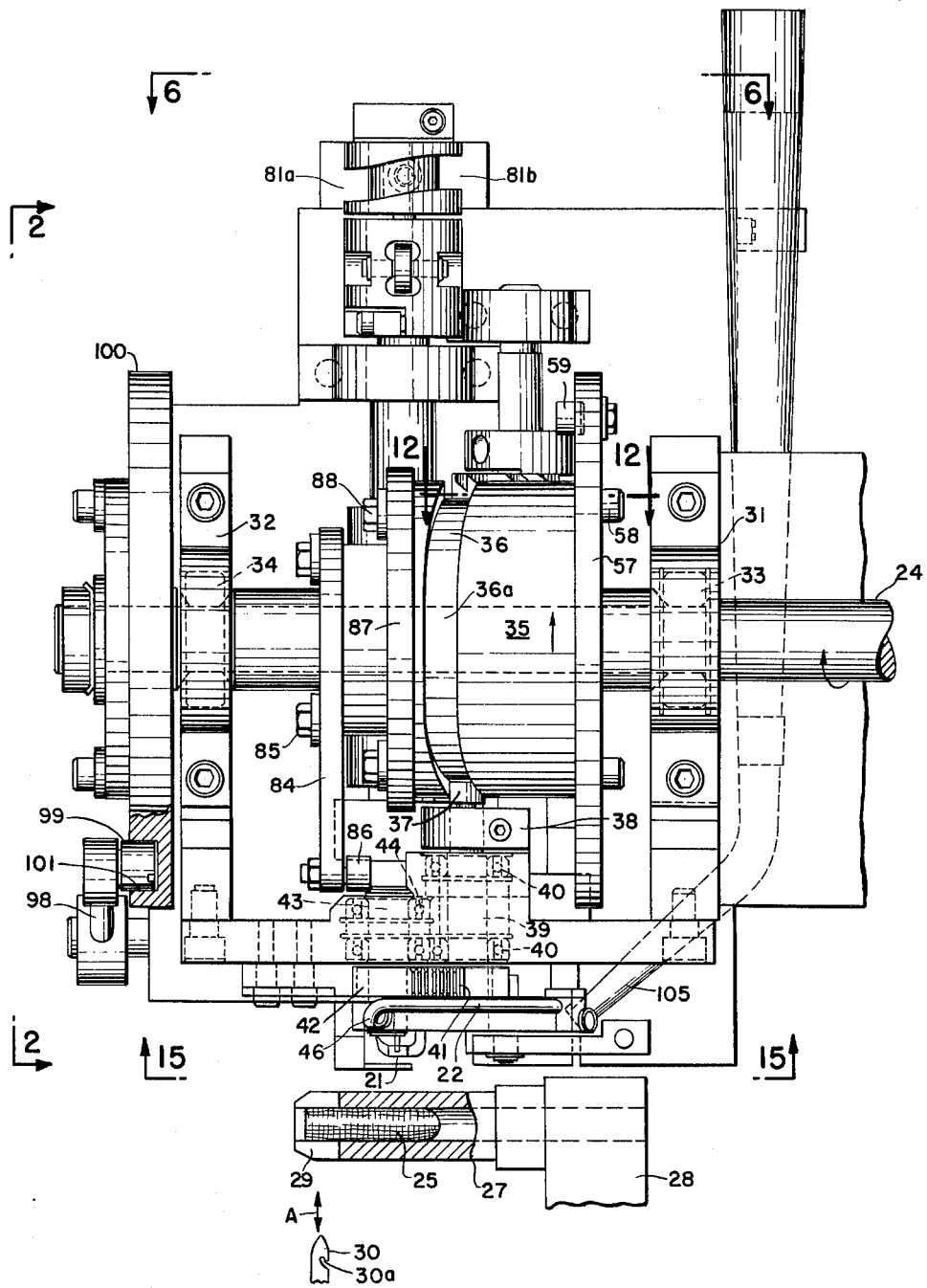
FIG. 1 is a side view of the knotter mechanism embodying the principles of the invention.

The illustrated knotter comprises, in general, a shuttle 20, a knotter bill 21, a flyer tube 22, and a cutter 23 which are all driven in properly timed sequence from a drive shaft 24 (see FIGS. 1 and 15). The apparatus is particularly adapted to be used in connection with sanitary products, such as tampons 25 (see FIG. 19), which are made of highly compressed absorbent fibrous material in substantially cylindrical form. The tampons 25 are provided with withdrawal cords 26 which are cut and knotted by the illustrated apparatus. Each of the tampons 25 is carried by a hollow holder 27 (see FIG. 1) fixed on a turret 28 that is rotatably mounted on a stationary machine part (not shown), and is intermittently driven by suitably driving apparatus in timed relationship with the shaft 24, whereby the holder 27 moves away from the observer, as the holder is illustrated in FIG. 1 or in the direction indicated by the arrow F in FIG. 15, with such intermittent movement of the turret 28.

Each of the holders 27 is provided with slots 29 in opposite sides through which a needle 30 may move. The needle 30 is suitably mounted, such as in accordance with the teachings of the previously mentioned application Serial No. 773,020, to move back and forth in the direction indicated by the arrow A, into and out of the slot 29.

The drive shaft 24 (see FIGS. 1 and 13) is rotatably mounted with respect to stationary machine parts 31 and 32 by means of bearings 33 and 34. The shaft 24 carries and has fixed thereon a barrel cam 35 having a cam slot 36 formed in it with a high dwell 36a and a low dwell 36b (see FIGS. 1 and 16). A follower roller 37 is disposed within the cam slot 36, and the roller 37 is carried by an arm 38 fixed on a shaft 39. The shaft 39 is rotatably disposed with respect to fixed frame parts by means of bearings 40 (see FIGS. 1 and 13), and has a gear segment 41 on its lower end (see FIGS. 13 and 15). The gear segment is in mesh with a spur gear 42 formed on the end of a shaft 43 that is rotatably disposed by means of bearings 44 (see FIG. 1). An arm 45 (see FIGS. 15, 16, and 17) is fixed with respect to the gear 42 and carries the flyer tube 22 on its outer end. The tube 22 is curved as shown and has a depending end 46 (see FIG. 1). The tube 22 is adapted to have string 47 (see FIG. 15) for forming the tampon withdrawal cords 26 (see FIG. 19) passing through it as will hereinafter be described in more detail.

The shutter 20 is in the form of a disk which is provided with a plurality of upstanding peripheral lugs 48 (see FIG. 5) and which is formed on a shaft 49. The shaft 49 extends into a larger diameter shaft 50 which is slotted on its lower end, and a clamp 51 extends about the lower end of the shaft 50 for fixing the shuttle 20 in the proper rotative position with respect to the shaft 50.

Figure 3:
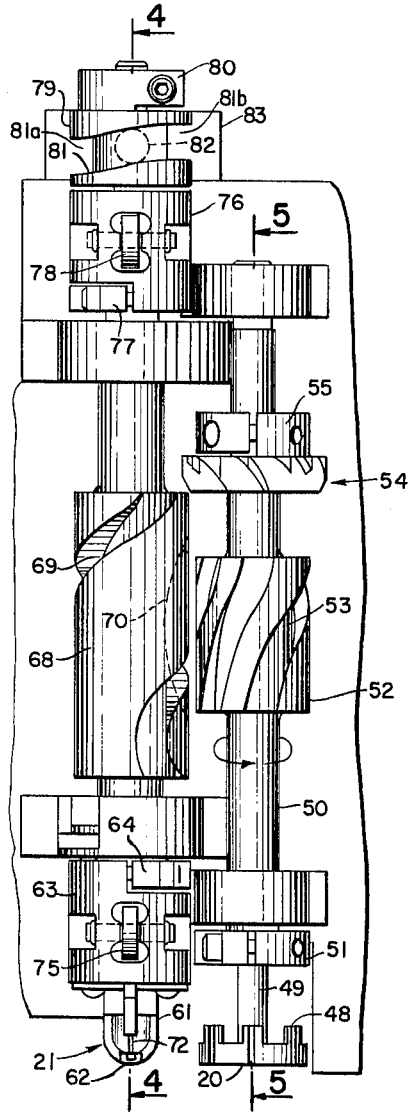
FIG. 3 is a sectional view taken from line 3—3 of FIG. 2.
Figure 11:
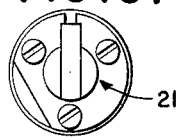
FIG. 11 is a bottom view of a certain portion of the knotter mechanism and taken from line 11—11 of FIG. 3.
Figures 4, 5:
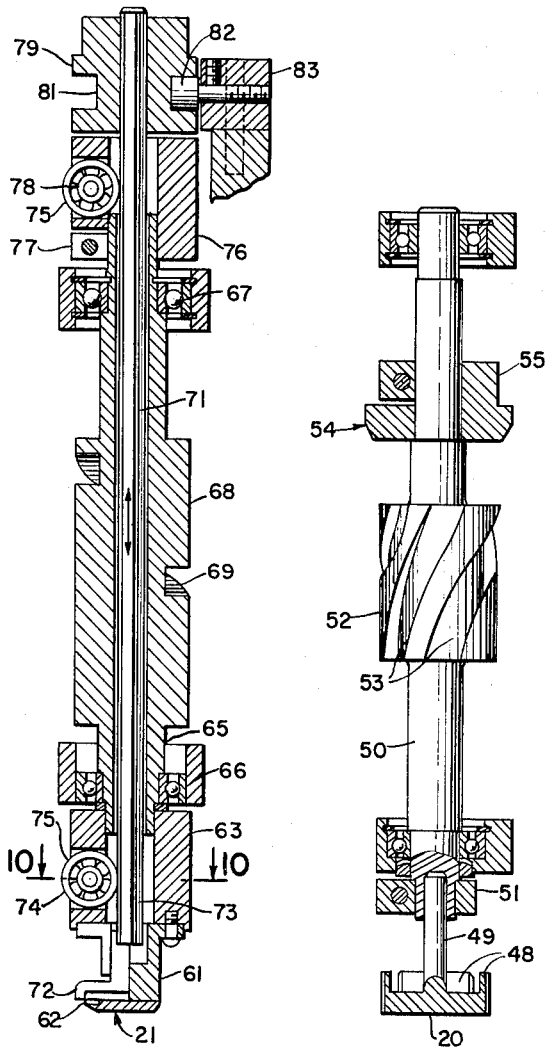
FIG. 4 is a sectional view taken on line 4—4 of FIG. 3.
FIG. 5 is a sectional view taken on line 5—5 of FIG. 3.
Figure 10:
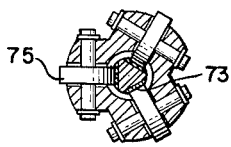
FIG. 10 is a sectional view taken on line 10—10 of FIG. 4.
Figure 7:
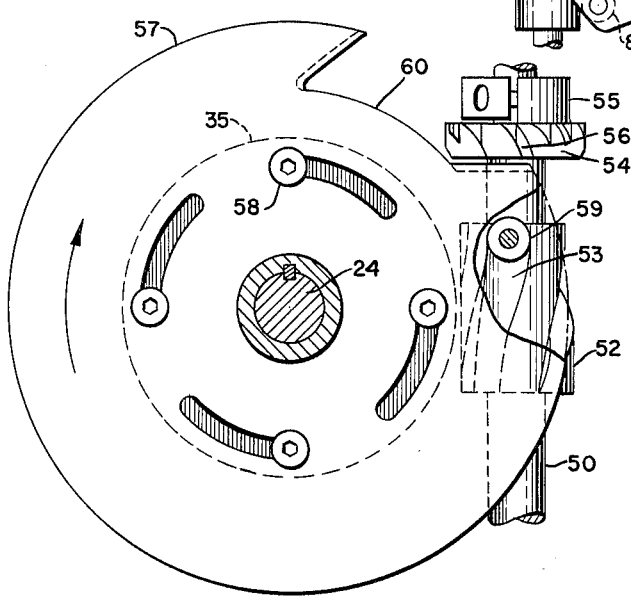
FIG. 7 is a sectional view taken from line 7—7 of FIG. 6.

A barrel cam 52 is formed on the shaft 50 and has 6 grooves 53 formed in its periphery, each of which begins and ends 60 degrees apart on opposite ends of the cam 52 (see FIGS. 3 and 5). A shuttle locking cam 54 is disposed on the shaft 50 and comprises a slotted hub portion 55 by means of which the cam 54 is adjustably fixed in the proper rotative position on the shaft 50. The cam 54 has a plurality of notches 56 (see FIG. 7) in its periphery for purposes to be described.

A drive plate 57 (see FIGS. 7 and 12) is fixed with respect to the barrel cam 35 by means of studs 58. The plate 57 carries a roller 59 which is adapted to enter the grooves 53 of the cam 52, and the plate 57 is provided with a notch 60 on its periphery adapted to allow movement of the cam 54 while the remainder of the periphery enters the notches 56 of the cam 54 and holds it and the shaft 50 against rotation, as will be hereinafter more fully described.

Figure 9:
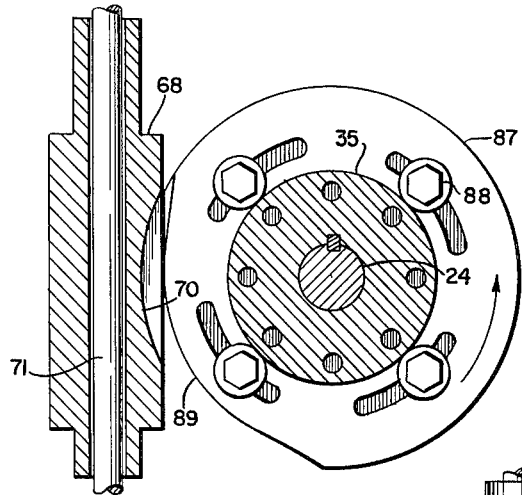
FIG. 9 is a sectional view taken on line 9—9 of FIG. 6.

The knotter bill 21 comprises a lower part 61 having an outwardly projecting bill tip 62 fixed thereto (see FIG. 4). The part 61 is fixed on to a coupling sleeve 63 having a contractible clamping portion 64 on its upper end by means of which the sleeve 63 and part 61 are fixed in proper rotative positions on a shaft 65. The shaft 65 is rotatably disposed by means of bearings 66 and 67, and a barrel cam 68 is formed integrally on the shaft 65. The cam 68 is provided with a slot 69 that travels completely around the cam for 360 degrees from one end of the cam to the other and is also provided with a longitudinal slot 70 in its periphery (see FIGS. 3, 8, and 9).

A relatively small diameter shaft 71 (see FIG. 4) extends through the shaft 65 and has a bill tip 72 formed on its bottom end which overlies the bill tip 62. The shaft 71 is provided with three flats 73 that run the length of the shaft. Three bearings 74 are carried by the sleeve 63 and have cylindrical outer surfaces 75 which make contact with the flats 73. A coupling sleeve 76, which is generally similar to the coupling sleeve 63, is provided at the upper end of the shaft 65. The sleeve 76 is provided with a contractible hub portion 77 by means of which it is fixed on the shaft 65, and the sleeve 76 carries three bearings 78 which are similar to the bearings 74 and have cylindrical outer surfaces 75 contacting the flats 73 on the shaft 71. The arrangement of the sleeves 63 and 76 and the associated bearings 74 and 78 in contact with the flats 73 assures that the shafts 65 and shaft 71 and the bill tip 72 with respect to the shaft 65 71 rotate together and allows upward movement of the and bill tip 62.

A cam 79 is disposed on the upper end of the shaft 71 and has a contractible hub portion 80 by means of which the cam is fixed in proper rotative position on the shaft 71. The cam 79 is formed with a groove 81 having a low portion 81a and a high portion 81b (see FIGS. 1 and 3). A roller 82 carried by a stationary part 83 is disposed in the groove 81.

Figure 6:
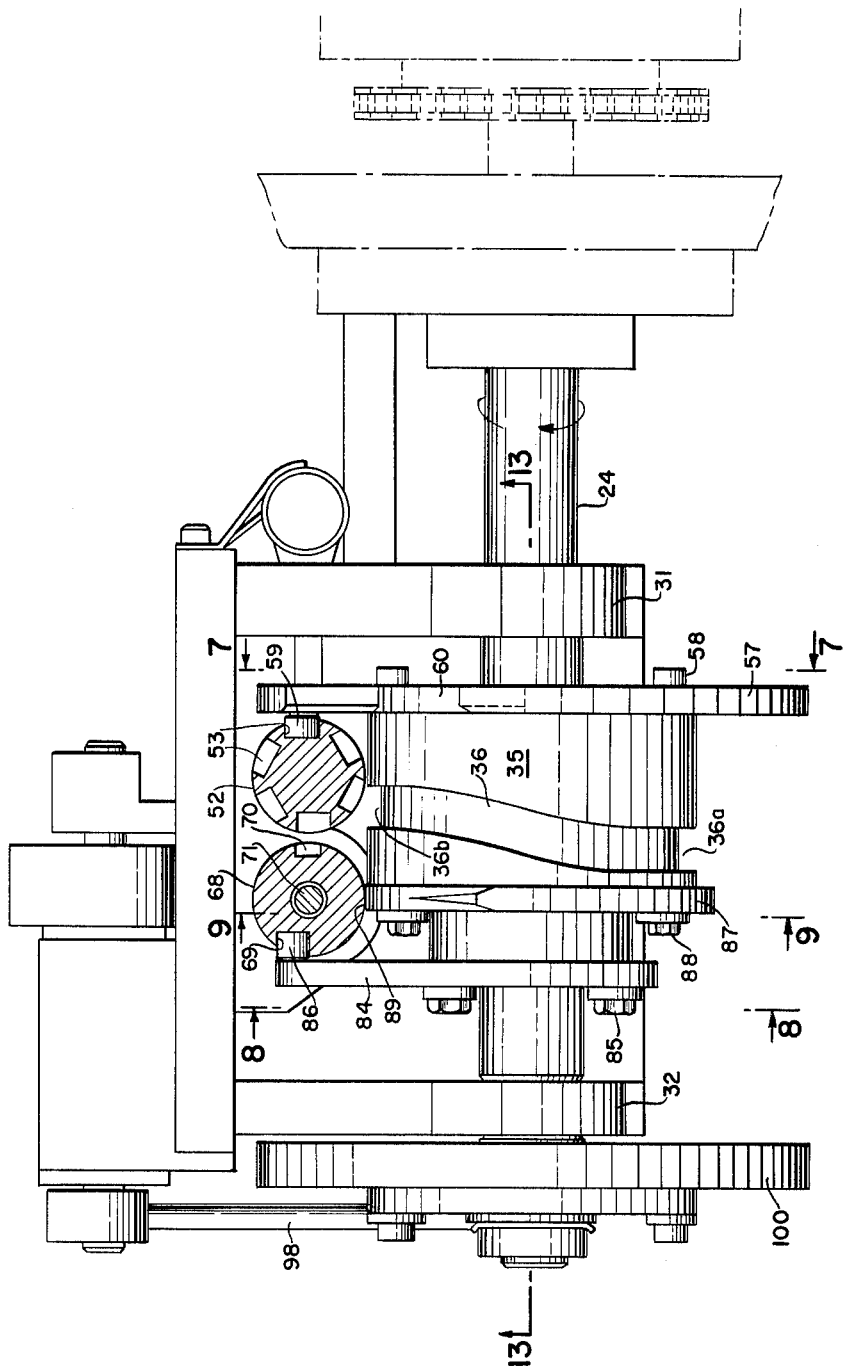
FIG. 6 is a top view of the knotter mechanism taken from line 6—6 of FIG. 1 with certain cams of the knotter mechanism being shown in section for better illustration.

A lever 84 (see FIGS. 6 and 8) is fixed by means of studs 85 with respect to the barrel cam 35. The lever 84 carries a roller 86 on its end which is adapted to enter into the slot 69 and thereby rotates the cam 68 and shafts 65 and 71. The barrel cam 35 also carries a cam lock disk 87 which is fixed thereto by means of studs 88 (see FIGS. 6 and 9). The disk 87 is provided with a cylindrical periphery entering the slot 70 in the cam 68 which is complete except for a relieved smaller diameter peripheral portion 89 (see FIG. 9) to allow the roller 86 moving through the cam groove 69 to rotate the cam 68 and shafts 65 and 71 and to subsequently hold the latter parts against rotation as will be hereinafter described in greater detail.

Figure 2:
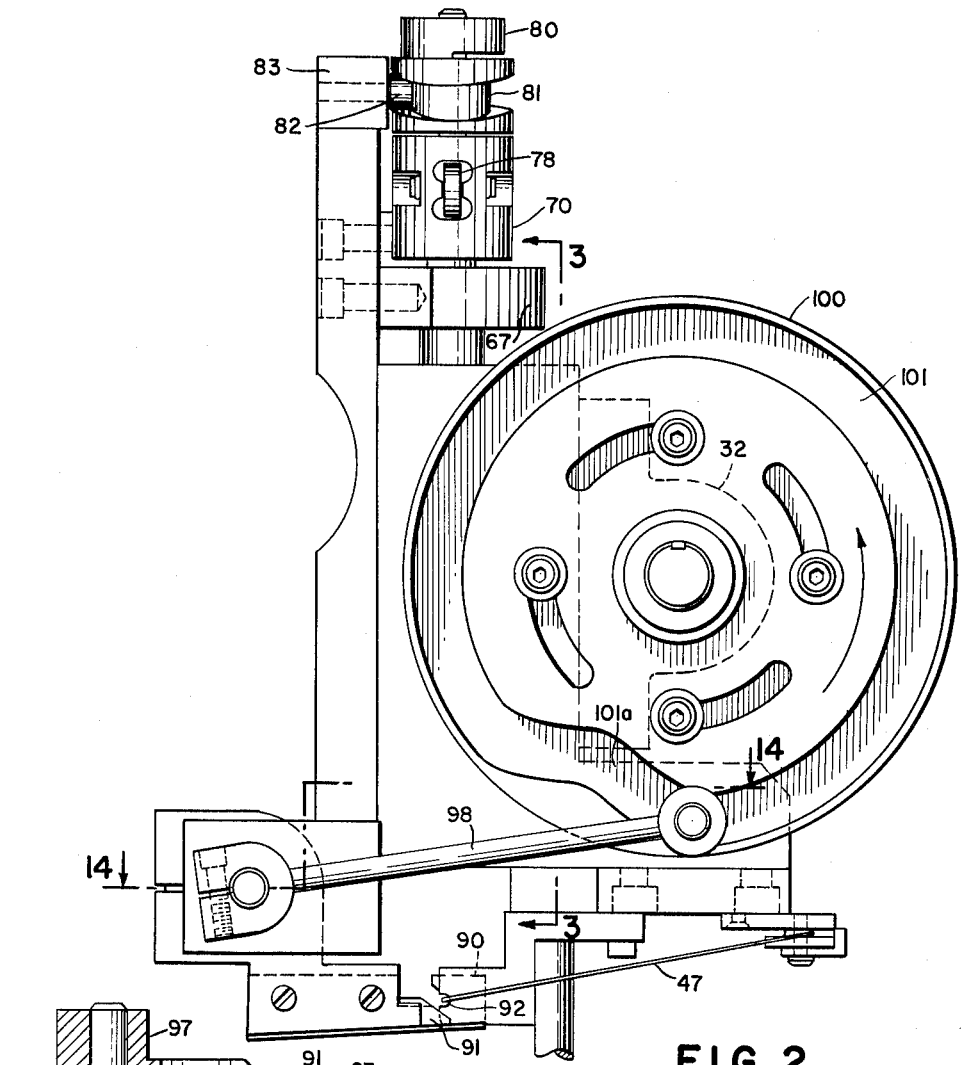
FIG. 2 is an end view of the knotter mechanism taken from line 2—2 of FIG. 1.
Figure 14:
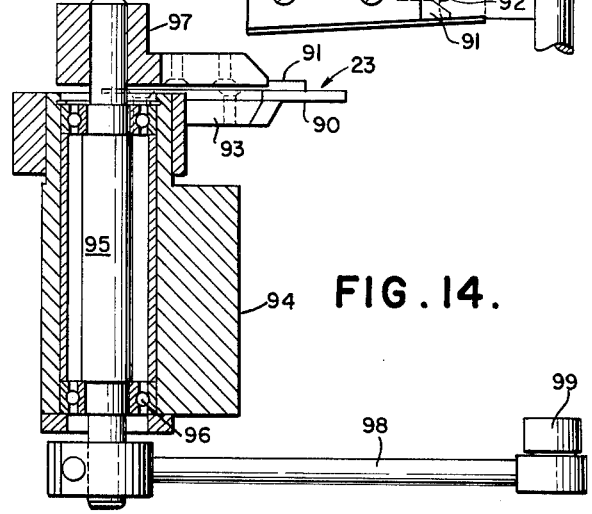
FIG. 14 is a sectional view taken on line 14—14 of FIG. 2.

The cutter 23 comprises a stationary knife blade 90 and a movable knife blade 91 (see FIGS. 2 and 14). The stationary knife blade 90 is provided with a notch 92 and is screwed on to a knife bracket 93 that is fixed onto a stationary housing 94. A shaft 95 is rotatably disposed in the housing 94 by means of bearings 96. A knife bracket 97 is fixed on one end of the shaft 95, and the movable knife blade 91 is screwed onto the bracket 97.

A lever 98 is fixed on the other end of the shaft 96 and carries a cam follower roller 99 on its movable end. A cam 100 is fixed on the end of the shaft 24 and has a cam slot 101 milled into it for receiving the roller 99. The slot 101 is disposed quite close to the periphery of the cam 100 except for an inwardly extending portion 101a.

A brake 102 (see FIG. 15) is provided for the shuttle 20. The brake 102 is in the form of a lever, and one end 102a of the lever is held in contact with the shuttle 20 by means of a compression spring 103 disposed between the lever and a stationary stud 104.

Figure 18:
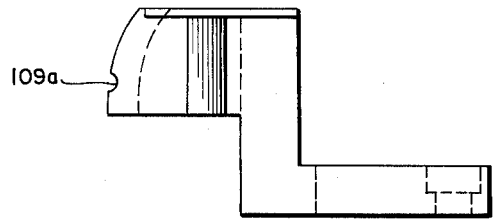
FIG. 18 is a sectional view on an enlarged scale taken on line 18—18 of FIG. 15.

The string 47 used by the knotter is provided from any suitable string ball or cone (not shown). After the string is cut by the cutter 23 as will be hereinafter described, cut ends of the string remain in the shuttle 20, and these string ends are drawn away by a tube 105 which is connected to a suitable vacuum source (not shown). The string passes through a string guide 106 (see FIG. 15) having a string retainer 107 disposed thereover. The string 47 passes from the guide 106 into one end of the flyer tube 22 supported by the arm 45 and thence out of the other end of the tube. In the positions of the parts illustrated in FIG. 15, the string 47 passes from the tube over a pin 108 carried by a string guide support 109, and also through a notch 109a (see FIG. 18) in the end of the support 109. From thence, the string passes around the knotter bill 21 through the slot 92 of the stationary knife blade 90 and into the shuttle 20, between a pair of the upstanding shuttle parts 48. A string guide plate 110 is fixed onto the guide support 109 and extends beneath the knotter bill 21, as shown.

Figure 20:
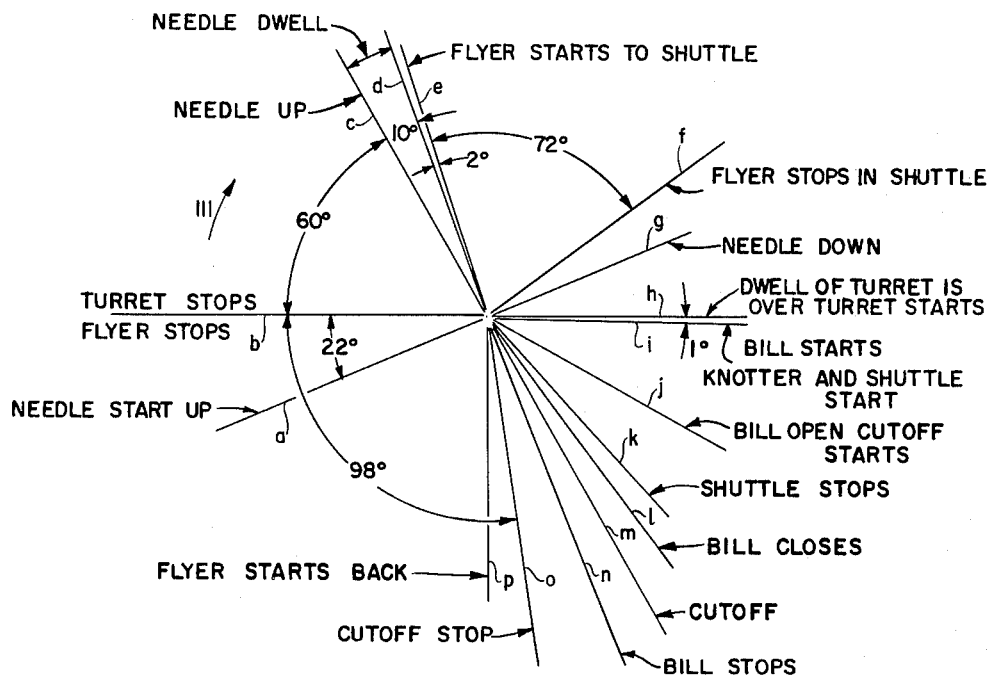
FIG. 20 is a diagram showing the beginnings and ends of the movements of various parts of the mechanism with respect to the degrees of rotation of a drive shaft for the mechanism.

In operation, the sequence of movements of the various parts of the knotter mechanism is illustrated in FIG. 20, and progression around FIG. 20 is made in the direction of arrow 111. The various positions indicated by the radial lines a, b, c, d, e, f, g, h, i, j, k, l, m, n, o, and p, are rotative positions of the drive shaft 24 at which the various parts start and stop movement. The radial line a indicates the position of the shaft 24 at which the needle 30 starts its upward movement from its position illustrated in FIG. 1 through the slots 29 of the carrier 27 for a tampon 25. The turret 28 at this time is being rotated about its center of rotation toward its position in which the tampon carrier tube is in alignment with the needle 30, as shown in FIG. 1. Also, at this time, the flyer tube 22 is retracting in the direction shown by the arrow B in FIG. 16; and at the point of rotation of the drive shaft 24 indicated by the radial line b, the flyer tube 22 has reached its fully retracted position shown in FIG. 16, and the turret 28 has stopped with the tube slots 29 in alignment with the needle 30.

At the point of rotation of the shaft 24 indicated by the radial line c, the needle 30 has passed completely through the slots 29 and through the tampon body 25 in the tube 27 and is at the upper limit of its movement. The pointed end of the needle 30 has passed between the pin 108 and the notch 109a (see FIGS. 15 and 18) and has moved the string slightly out of alignment with its former position in reaching the limit of its upward movement. The needle remains in its uppermost position until the point of rotation of the shaft 24 indicated by the line d is reached and, at this time, the needle 30 begins its downward movement.

Very shortly after the needle 30 begins downward movement, as indicated by the radial line e in FIG. 20, the flyer 22 starts to move toward the shuttle 20, traveling in the direction indicated by the arrow C in FIG. 17. The needle 30 in its downward movement catches the string 47 extending between the support notch 109a and the pin 108 in the notch 30a of the needle; and as the needle continues its downward movement, it pulls a loop of the string 47 through the tampon 25. The flyer tube 22 in moving in the direction C supplies string to the tampon for forming this loop and, at this time, there is little relative movement of the string 47 within and relative to the tube of the flyer 22. One end of the string 47, at this time, is held by the shuttle 20, in particular, between one of the upstanding lugs 48 of the shuttle 20 and the brake lever 102.

The flyer 22 completes its movement into the shuttle 20 when the shaft 24 reaches the degree of its movement indicated by the line f in FIG. 20; the depending end 46 of the flyer tube 22 having passed between a pair of the upstanding lugs 48 of the shuttle 20, and the tube end 46 is within the lugs 48 (see FIG. 17). The string 47 under these conditions is in the form of a loop, one end being gripped as before between the brake lever 102 and one of the lugs 48 and the other end extending from the depending end of the flyer tube 22 between a pair of lugs 48. Both sides of the loop extend through the notch 92, over the tips 62 and 72 of the knotter bill 21 (the bill 21 under these conditions is in its rotative position shown in FIGS. 15 and 17) around the end of the string guide support 109 and downwardly through the tampon 25 to the needle 30, which at this time is nearly at the limit of its downward movement underneath the tampon tube 27. The needle 30 completes its downward movement at the degree of rotation of the shaft 24 indicated by the line $g$ in FIG. 20.

The turret 28 beings its movement toward its next indexed position, in which another tampon 25 carried by a tube 27 is positioned in the line of movement of the needle 30, at the point of rotation of the shaft 24 indicated by the line $h$ in FIG. 20; and a rotation of the bill 21 begins very shortly thereafter at the point of rotation of the shaft 24 indicated by the line $i$ in FIG. 20. The turret 28 and tubes 27 move in the direction indicated by the arrow F in FIG. 15. The bill 21 is closed, that is, the bill parts 62 and 72 are in their in-contact positions at this time. The shuttle 20 begins rotation at the same time as the bill 21 begins rotation at the point of rotation of the shaft 24 indicated by the line $i$. The bill and shuttle rotate in the directions D and E, respectively, indicated in FIG. 15.

The bill 21 continues its rotation, and somewhat prior to a half revolution of the bill 21, the bill opens, that is, its parts 62 and 72 separate, the point of rotation of the shaft 24 at this time being indicated by the line $j$ in FIG. 20. At the same time, the movable knife blade 91 begins to move toward the slot 92 in the fixed knife blade 90.

The shuttle 20 has completed its rotative movement of ⅙ revolution at the same time the shaft 24 reaches the point of rotation indicated by the line $k$ in FIG. 20; and, at this time, both ends of the loop of string extending from the tampon 25 to the shuttle 20 are clamped between a lug 48 of the shuttle and the brake lever 102. The bill 21 is continuing its rotation at this time, and at a point of rotation of the shaft 24 indicated by the line $l$ in FIG. 20, the bill 21 closes with the part 72 coming downwardly onto the part 62 and thereby gripping the two strands of string 47 constituting a part of the loop from the tampon 25 and extending from the shuttle 20 to the string guide 109. The shuttle 20 and guide 109 hold the string in the proper vertical position for gripping by the bill 21. The bill 21 rotates in the direction indicated by the arrow D in FIG. 15, so that it tends to pull the string outwardly of the shuttle 20, and the brake 102 permits a slight such movement; however, a cutoff by the movable knife blade 91 is complete shortly after the bill closes, namely, at a point of rotation of the shaft 24 indicated by the line $m$. The movable knife blade 91 then begins its rotative movement away from the slot 92.

The bill 21, after having gripped the two stretches of string 47 extending to the shuttle 20 at the point of rotation of the shaft 24 indicated by the line $l$, stops its rotation at the point of rotation of shaft 24 indicated by the line $n$ in FIG. 20 and at its position shown in FIGS. 15 and 17. The turret 28, during these various movements of the other parts of the machine subsequent to the line $h$, is continuing its indexing movement in the direction indicated by the arrow F in FIG. 15. The string 47 is quite tightly disposed in the tampon 25, since the tampon is relatively dense, and the indexing movement of the turret 28 carrying the tampon 25 with it draws the string, which is now looped around the bill 21, downwardly off the round outer bill part 61. The bill is closed and grips the two ends of the string; and, therefore, as the string moves off of the outer bill part 61, the tips 62 and 72 pull the string ends through the loop of string pulled off the outer bill parts 61 and a knot in the two ends of the string thus is formed. Finally, rotation of the turret 28 is sufficient to pull the two extreme ends of the string loop from between the bill parts 62 and 72, so that the tampon 25 now carries the loop of string with it which has been knotted by the bill 21.

Referring to FIG. 19, the knot 26$a$ has thus been tied into the double stretch of the withdrawal cord 26, and the hooked needle 30 has left a loop 26$b$ in the other end of the double cord 26. The end of the looped string 26 having the knot 26$a$ tied into it on one side of the tampon 25 is subsequently passed through the string loop 26$b$ on the other side of the tampon, and the loop is drawn tight around the tampon, by other appropriate mechanism not herein described but which is, for example, shown disclosed in the co-pending application, Serial No. 773,020, hereinbefore referred to.

The movable knife 91 stops at the degree of rotation of the shaft 24 indicated by the line $o$ in FIG. 20, and the flyer tube 22 starts its return movement back toward its position shown in FIG. 16 when the degree of rotation of the shaft 24 indicated by the line $p$ in FIG. 20 is reached. The shuttle 20 and particularly one of its lugs 48 acting in conjunction with the brake lever 102 grips the end of the string 47 during the return movement of the flyer 22, and the string is drawn out of the tube 22 so that it stretches across the bill 21, guide 109 and pin 108 as shown in FIG. 15 when the tube 22 reaches its fully retracted position.

The swinging movement of the flyer tube 22 is caused by the follower roller 37 moving within the slot 36 of the barrel cam 35. As the roller 37 moves within the slot, it rotates the follower arm 38, the shaft 39, and the segment 41. The segment 41 is in mesh with the gear 42 and thereby rotates the arm 45 and thus the tube 22.

The movement of the shuttle 20 is caused by the follower 59 traveling through one of the grooves 53 in the barrel cam 52 (see FIG. 7), and the edge of the plate 57 in traveling through notches 56 of the cam 54 holds the shaft 50 and thereby the shuttle 20 in their various indexed positions. It will be noted that each of the grooves 53 is so cut in the cam that the grooves 53 each cause a ⅙ revolution of the shaft 50 and the shuttle 20 as the follower roller 59 passes through the groove 53.

Figure 8:
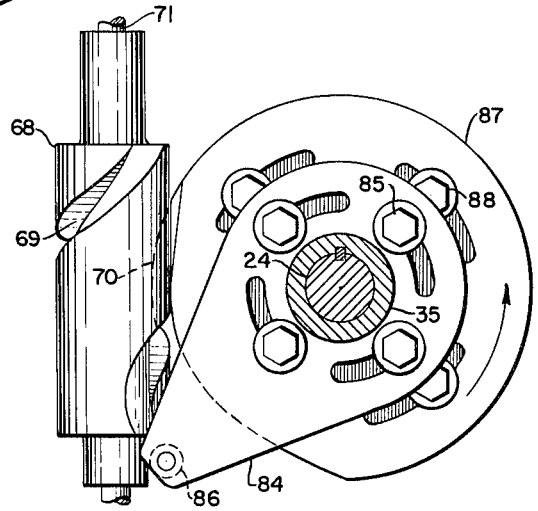
FIG. 8 is a sectional view taken on line 8—8 of FIG. 6.

The rotative movement of the knotter bill 21 is caused by the roller 86 traveling through the groove 69 in the barrel cam 68 (see FIG. 8). The string gripping action of the bill tips 62 and 72 is provided by the cam 79 which is fixed with respect to the shaft 71 and the roller 82 carried by the stationary part 83 that is disposed within the groove 81 of the cam 79 (see FIG. 4). The shafts 71 and 65 rotate together due to the cylindrical bearings 74 and 78 that are in contact with the flats 73, and the bearings allow the shaft 71 to move vertically within and with respect to the shaft 65. Therefore, as the shafts 71 and 65 rotate, the shaft 71 is first moved upwardly to open the bill tips 62 and 72 and is then moved downwardly to grip the string between these tips. The cam 68 and shafts 71 and 65 are held in indexed positions between movements of the roller 86 through the groove 69 by means of the disk 87 traveling within the slot 70 in the cam 68 for most of the rotative movement of the shaft 24 (see FIG. 9).

The knife blade 91 is moved by the cam roller 99 traveling within the groove 101 of the cam 100. The roller 91 moves toward and away from the center of the cam 100 and oscillates the shaft 95 by means of the arm 98 on which the roller is disposed. The blade 91 is fixed with respect to the shaft 95, and rotative movement is thereby accorded to the blade 91.

The knotter mechanism including the shuttle 20, the bill 21, the flyer 22, and the cutter 23 effectively ties a knot in the two ends of a string pulled through a tampon 25 in the form of a loop. The movements of all of these parts are provided by cam and follower mechanisms, the cam 35 for the flyer tube 22, the cam 100 for the cutter 23, the cam 52 for the shuttle 20 and the cam 68 for the knotter bill 21. Each of these parts thus is reliably driven by sturdy driving mechanism, and the knotter mechanism as a whole is thus sturdy, long lived, reliable and fast in operation.

I wish it to be understood that the invention is not to be limited to the specific constructions, arrangements and devices shown and described, except only insofar as the claims may be so limited, as it will be understood to those skilled in the art that changes may be made without departing from the principles of the invention.

What is claimed is:

1. In a knot tying mechanism, the combination of a shuttle constructed to receive and grip a string; a flyer for carrying the string to the shuttle and a rotatable knotter bill having two gripping tips adapted to be separated and to come together to grip the string as the knotter will is rotated; and driving mechanism for said knotter bill and flyer which moves the knotter bill and flyer in timed relationship with each other so that the flyer brings the string into the shuttle for gripping by the latter and the knotter bill rotates and grips the string extending into the shuttle by means of said gripping tips and ties a knot in the string due to the rotation of the knotter bill.

2. In a knot tying mechanism, the combination of a rotatable shutter having a plurality of separated tabs circularly disposed and a lever in binding relationship with said tabs; a flyer for carrying string to the shuttle; and a rotatable knotter bill having two gripping tips adapted to be separated and to grip the string as the knotter bill is rotated; and driving mechanism for said shuttle, said knotter bill and said flyer which moves the knotter bill, shuttle and flyer in timed relationship with each other so that the flyer brings the string into the shuttle between its said tabs, the shuttle thereafter is rotated to grip the string between one of its tabs and said lever and the knotter bill moves subsequently to the stretching of the string across it to said shuttle for gripping the string by means of said gripping tips and ties a knot in the string due to the rotation of the knotter bill.

3. In a knot tying mechanism; the combination of a rotatable shuttle having a plurality of separated tabs circularly disposed and a lever in binding relationship with said tabs; a flyer for carrying string to the shuttle; and a rotatable knotter bill having two gripping tips adapted to be separated and to grip the string as the knotter bill is rotated; and driving mechanism for said shuttle, said knotter bill and said flyer which moves the knotter bill, shuttle, and flyer in timed relationship with each other so that the flyer brings the string into the shuttle, the shuttle thereafter is rotated to grip the end oft he string between one of said tabs and said lever, and the knotter bill rotates after the string is thus brought to the shuttle so as to grip the string between said gripping tips and ties a knot in the string due to the rotation of the knotter bill.

4. In a knot tying mechanism, the combination of a shuttle constructed to receive and grip a string on actuation of the shuttle; string holding means, a flyer for carrying a string gripped at one end thereof by said shuttle to said string holding means and for returning the string to said shuttlef org ripping by the latter so as to provide a going portion and a return portion of the string, a rotatable knotter bill having two gripping tips adapted to be separated and to come together to grip both portions of the string as the knotter bill is rotated; and driving mechanism for actuating said shuttle, said knotter bill and said flyer in timed relationship to each other so that the flyer loops the string from said shuttle around said string holding means and back to said shuttle, the shuttle thereafter is actuated to grip the string from the flyer, and the knotter bill is thereafter actuated so as to open and grip the two portions of the string extending between said shuttle and string holding means so as to tie a knot in them due to the rotation of the knotter bill.

5. In a knot tying mechanism; the combination of a shuttle constructed to receive and grip a string on actuation of the shuttle; string holding means; a flyer for carrying the string gripped at one end thereof by said shuttle to said string holding means and for returning the string to said shuttle for gripping by the latter so as to provide a going portion and a return portion of the string; a rotatable knotter bill having two gripping tips adapted to be separated and to come together to grip both portions of the string as the knotter bill is rotated; a cutter disposed between said knotter bill and said shuttle; and driving mechanism for actuating said shuttle, said cutter, said knotter bill and said flyer in timed relationship to each other so that the flyer loops the string from said shuttle around said string holding means and back to said shuttle, the shuttle thereafter is actuated to grip the string from said flyer, and the knotter bill and cutter are thereafter actuated so that the cutter cuts the two portions of the string and the knotter bill opens and grips the two portions of the string so as to tie a knot in them due to the rotation of the knotter bill.

6. In a knot tying mechanism; the combination of a shuttle constructed to receive and grip a string on actuation of the shuttle; a hooked device adapted to be reciprocated and hook the string; a flyer for carrying the string gripped at one end thereof by said shuttle to said hooked device and for returning the string to said shuttle for gripping by the latter so as to provide a going portion and a return portion of the string; a rotatable knotter bill having two gripping tips adapted to be separated and to come together to grip both portions of the string as the knotter bill is rotated; a cutter disposed between said knotter bill and said shuttle; and driving mechanism for said shuttle, knotter bill, flyer, hooked device and said cutter for actuating these parts in timed relationship to each other so that the flyer loops the string around said hooked device from and to said shuttle and the shuttle thereafter is actuated to grip the return portion of the string along with said going string portion, the knotter bill is rotated to thereafter close the knotter bill onto the two portions of the string for gripping them and tying a knot into the string due to the rotation of the knotter bill, the cutter is effective to cut the two portions of the string at about the same time as the knotter bill closes, and the hooked device is retracted carrying the string with it at about the same time as the flyer moves back to the shuttle.

7. In a knot tying mechanism; the combination of a rotatable shuttle having a plurality of separated tabs circularly disposed and a lever in binding relationship with said tabs for gripping a string therebetween; a rotatable knotter bill having two gripping tips rotatably movable together and longitudinally movable with respect to each other so as to be separable to receive a string between them; a flyer tube movable from a first position in proximity to said shuttle to a retracted position for carrying string from said shuttle and around said knotter bill and looping it back to said shuttle to form a double thickness of string; a cutter effective on the string between said knotter bill and said shuttle; a hooked needle movable to hook onto the string extending from said knotter bill to said flyer tube when the latter is in retracted position; and driving mechanism for said knotter bill, shuttle, cutter, flyer tube and needle for moving these parts in timed relationship with each other so that said flyer tube retracts from said shuttle with the end of the string from the flyer tube being gripped between one of the tabs of the shuttle and said lever, the needle moves to hook onto the string from said flyer tube as the tube is retracted, the flyer tube thereafter is moved back to said shuttle and said needle is retracted about the same time carrying said string, said shuttle is then rotated so as to grip between one of said tabs and said lever the end of the loop of string extending from said flyer tube when the tube is in its said first position, the knotter bill is rotated so as to grip the double thickness of string extending between said needle and shuttle between the tips of said knotter bill whereby to tie a knot in the string as the string is pulled off of the knotter bill by retracting movement of said needle, and the cutter is actuated to cut the string after said knotter bill closes and while the knot is being tied in the string.

8. In a knot tying mechanism; the combination of a rotatable shuttle having a plurality of separated tabs circularly disposed and a lever in binding relationship with said tabs for gripping a string therebetween; a rotatable knotter bill having two gripping tips rotatably movable together and longitudinally movable with respect to each other so as to be separable to receive a string between them; a flyer tube movable from a first position in proximity to said shuttle to a retracted position for carrying string from said shuttle and around said knotter bill and looping it back to said shuttle to form a double thickness of string; a cutter effective on the string between said knotter bill and said shuttle; a hooked needle movable to hook onto the string extending from said knotter bill to said flyer tube when the latter is in retracted position; and driving mechanism for said knotter bill, shuttle, cutter, flyer tube and needle for moving these parts in timed relationship with each other so that said flyer tube retracts from said shuttle with the end of the string from the flyer tube being gripped between one of the tabs of the shuttle and said lever, the needle moves to hook onto the string from said flyer tube as the tube is retracted, the flyer tube thereafter is moved back to said shuttle and said needle is retracted about the same time carrying said string, said shuttle is then rotated so as to grip between one of said tabs and said lever the end of the loop of string extending from said flyer tube when the tube is in its said first position, the knotter bill is rotated so as to grip the double thickness of string extending between said needle and shuttle between the tips of said knotter bill whereby to tie a knot in the string as the string is pulled off of the knotter bill by retracting movement of said needle, and the cutter is actuated to cut the string after said knotter bill closes and while the knot is being tied in the string; said driving mechanism for said shuttle comprising a barrel cam drivingly connected to the shuttle and having grooves on its periphery, a rotatable driving member, and a roller carried by said rotatable member and adapted to pass through said grooves.

9. In a knot tying mechanism; the combination of a rotatable shuttle having a plurality of separated tabs circularly disposed and a lever in binding relatonship with said tabs for gripping a string therebetween; a rotatable knotter bill having two gripping tips rotatably movable together and longitudinally movable with respect to each other so as to be separable to receive a string between them; a flyer tube movable from a first position in proximity to said shuttle to a retracted position for carrying string from said shuttle and around said knotter bill and looping it back to said shuttle to form a double thickness of string; a cutter effective on the string between said knotter bill and said shuttle; a hooked needle movable to hook onto the string extending from said knotter bill to said flyer tube when hte latter is in retracted position; and driving mechanism for said knotter bill, shuttle, cutter, flyer tube and needle for moving these parts in timed relationship with each other so that said flyer tube retracts from said shuttle with the end of the string from the flyer tube being gripped between one of the tabs of the shuttle and said lever, the needle moves to hook onto the string from said flyer tube as the tube is retracted, the flyer tube thereafter is moved back to said shuttle and said needle is retracted about the same time carrying said string, said shuttle is then rotated so as to grip between one of said tabs and said lever the end of the loop of string extending from said flyer ube when the tube is in its said first position, the knotter bill is rotated so as to grip the double thickness of string extending between said needle and shuttle between the tips of said knotter bill whereby to tie a knot in the string as the string is pulled off of the knotter bill by retracting movement of said needle, and the cutter is actuated to cut the string after said knotter bill closes and while the knot is being tied in the string; said knotter bill comprising a pair of concentrically disposed rotatable shafts the inner one of which is longitudinally movable but non-rotatable with respect to the outer shaft; a cam fixed with respect to said inner shaft and thereby with respect to one of said gripping tips of the knotter bill and a stationary follower disposed in a groove formed in said cam so that said last named gripping tip is moved toward and away from the other gripping tip of the knotter bill as said inner and outer shafts are rotated; said driving mechanism including a barrel cam on said outer shaft having a substantially helical groove therein and a rotatable driving element having a roller adapted to enter into and pass through said last named groove and thereby to rotate said shafts and thereby said knotter bill.

10. In a knot tying mechanism; the combination of a rotatable shuttle having a plurality of separated tabs circularly disposed and a lever in binding relationship with said tabs for gripping a string therebetween; a rotatable knotter bill having two gripping tips rotatably movable together and longitudinally movable with respect to each other so as to be separable to receive a string between them; a flyer tube movable from a first position in proximity to said shuttle to a retracted position for carrying string from said shuttle and around said knotter bill and looping it back to said shuttle to form a double thickness of string; a cutter effective on the string between said knotter bill and said shuttle; a hooked needle movable to hook onto the string extending from said knotter bill to said flyer tube when the latter is in retracted position; and driving mechanism for said knotter bill, shuttle, cutter, flyer tube and needle for moving these parts in timed relationship with each other so that said flyer tube retracts from said shuttle with the end of the string from the flyer tube geing gripped between one of the tabs of the shuttle and said lever, the needle moves to hook onto the string from said flyer tube as the tube is retracted, the flyer tube thereafter is moved back to said shuttle and said needle is retracted about the same time carrying said string, said shuttle is then rotated so as to grip between one of said tabs and said lever the end of the loop of string extending from said flyer tube when the tube is in its said first position, the knotter bill is rotated so as to grip the double thickness of string extending between said needle and shuttle between the tips of said knotter bill whereby to tie a knot in the string as the string is pulled off of the knotter bill by retracting movement of said needle, and the cutter is actuated to cut the string after said knotter bill closes and while the knot is being tied in the string; said cutter comprising a stationary blade, a movable blade, an oscillatable shaft connected to said movable blade so as to move the latter blade across said fixed blade; said driving mechanism including a cam having a non-circular groove therein and a follower roller oscillatable with said shaft and disposed in said groove so as to cause movement of said movable blade across said fixed blade.

11. In a knot tying mechanism; the combination of a rotatable shuttle having a plurality of separated tabs circularly disposed and a lever in binding relationship with said tabs for gripping a string therebetween; a rotatable knotter bill having two gripping tips rotatably movable together and longitudinally movable with respect to each other so as to be separable to receive a string between them; a flyer tube movable from a first position in proximity to said shuttle to a retracted position for carrying string from said shuttle and around said knotter bill and looping it back to said shuttle to form a double thickness of string; a cutter effective on the string between said knotter bill and said shuttle; a hooked needle movable to hook onto the string extending from said knotter bill to said flyer tube when the latter is in retracted position; and driving mechanism for said knotter bill, shuttle, cutter, flyer tube and needle for moving these parts in timed relationship with each other so that said flyer tube retracts from said shuttle with the end of the string from the flyer tube being gripped between one of the tabs of the shuttle and said lever, the needle moves to hook onto the string from said flyer tube as the tube is retracted, the flyer tube thereafter is moved back to said shuttle and said needle is retracted about the same time carrying said string, said shuttle is then rotated so as to grip between one of said tabs and said lever the end of the loop of string extending from said flyer tube when the tube is in its said first position, the knotter bill is rotated so as to grip the double thickness of string extending between said needle and shuttle between the tips of said knotter bill whereby to tie a knot in the string as the string is pulled off of the knotter bill by retracting movement of said needle, and the cutter is actuated to cut the string after said knotter bill closes and while the knot is being tied in the string; said driving mechanism includng a barrel cam having a non-cylindrical groove therein, a rotatable shaft carrying said flyer, a follower disposed in said groove and fixed with respect to a gear segment, and a spur gear rotatable with said shaft and in mesh with said gear segment whereby the cam and follower are operative to move the flyer.

References Cited by the Examiner

UNITED STATES PATENTS

| | | | |
|---|---|---|---|
| 2,009,491 | 7/1935 | Goldberger | 289—2 |
| 2,182,959 | 12/1939 | Bunn | 289—2 |
| 2,460,489 | 2/1949 | Burkard | 289—2 |
| 2,462,178 | 2/1949 | Ganz | 19—144.5 |
| 2,715,374 | 8/1955 | Corrier | 112—2 |
| 3,131,435 | 5/1964 | Cloots et al. | 19—144.5 |

DONALD W. PARKER, *Primary Examiner.*